US012659697B2

(12) United States Patent
Zhong et al.

(10) Patent No.: US 12,659,697 B2
(45) Date of Patent: Jun. 16, 2026

(54) SERVICE TRANSMISSION METHOD, SERVICE TRANSMISSION MODE CONFIGURATION METHOD, AND RELATED DEVICE

(71) Applicant: VIVO MOBILE COMMUNICATION CO., LTD., Dongguan (CN)

(72) Inventors: Tingting Zhong, Dongguan (CN); Zhenhua Xie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 744 days.

(21) Appl. No.: 17/945,515

(22) Filed: Sep. 15, 2022

(65) Prior Publication Data

US 2023/0007445 A1 Jan. 5, 2023

Related U.S. Application Data

(63) Continuation of application No. PCT/CN2021/085175, filed on Apr. 2, 2021.

(30) Foreign Application Priority Data

Apr. 3, 2020 (CN) .......................... 202010261439.5

(51) Int. Cl.
*H04W 4/06* (2009.01)

(52) U.S. Cl.
CPC .................................... *H04W 4/06* (2013.01)

(58) Field of Classification Search
CPC ....... H04W 4/06; H04W 76/40; H04W 48/10; H04W 76/11; H04L 12/189; H04L 12/18
See application file for complete search history.

(56) References Cited

U.S. PATENT DOCUMENTS

2004/0229605 A1 11/2004 Hwang et al.
2011/0116433 A1 5/2011 Dorenbosch
(Continued)

FOREIGN PATENT DOCUMENTS

CN 101174966 A 5/2008
CN 101237599 A 8/2008
(Continued)

OTHER PUBLICATIONS

European Patent Office, Extended European Search Report for European Patent Application No. 21782408.5 dated Jul. 10, 2023.
(Continued)

*Primary Examiner* — Santiago Garcia
(74) *Attorney, Agent, or Firm* — BROOKS KUSHMAN P.C.

(57) ABSTRACT

The present disclosure provides a service transmission method, a service transmission mode configuration method, and a related device. The service transmission method includes: receiving a first message from a core-network-side device, where the first message includes a multicast service identifier and mode policy information; and sending, in a first transmission mode, data of a multicast service corresponding to the multicast service identifier, where the first transmission mode is a transmission mode determined based on the mode policy information, or the first transmission mode is a transmission mode indicated by the mode policy information.

17 Claims, 7 Drawing Sheets

(56)     References Cited

U.S. PATENT DOCUMENTS

| | | | | |
|---|---|---|---|---|
| 2018/0035405 | A1 | 2/2018 | Fujishiro et al. | |
| 2019/0090098 | A1 | 3/2019 | Byun et al. | |
| 2019/0191279 | A1 | 6/2019 | Fujishiro et al. | |
| 2021/0168786 | A1* | 6/2021 | Takano | H04W 72/30 |
| 2021/0219106 | A1* | 7/2021 | Li | H04W 60/04 |
| 2021/0243567 | A1* | 8/2021 | Takano | H04W 4/06 |
| 2021/0352444 | A1* | 11/2021 | Griot | H04W 28/0268 |
| 2022/0264527 | A1* | 8/2022 | Zong | H04W 4/06 |
| 2022/0361179 | A1* | 11/2022 | Kwon | H04L 1/1854 |
| 2022/0377649 | A1* | 11/2022 | Choi | H04W 48/12 |
| 2022/0408317 | A1* | 12/2022 | Zhao | H04W 36/0009 |
| 2023/0345310 | A1* | 10/2023 | Li | H04W 4/06 |

FOREIGN PATENT DOCUMENTS

| | | | |
|---|---|---|---|
| CN | 101242557 A | 8/2008 | |
| CN | 102651846 A | 8/2012 | |
| CN | 106162565 A | 11/2016 | |
| WO | 2017124802 A1 | 7/2017 | |
| WO | 2018043243 A1 | 3/2018 | |
| WO | 2020063362 A1 | 4/2020 | |

OTHER PUBLICATIONS

Japanese Patent Office, First Office Action for Japanese Patent Application No. 2022-560142 dated Jul. 4, 2023.

China National Intellectual Property Administration (ISA/CN), International Search Report issued in corresponding Application No. PCT/CN2021/085175, mailed Jun. 24, 2021.

The State Intellectual Property Office of People's Republic of China, First Office Action issued in corresponding Application No. 202010261439.5.

TCL Communication Ltd. "Radio Bearer based Multicast PTM and PTP mode switching" 3GPP TSG-RAN WG2 #111e, R2-2006569, Aug. 7, 2020. See: ISR.

TCL Communication Ltd. "Discussion on MBS Control Information Configuration" 3GPP TSG-RAN WG2 Meeting #113e R2-2101892, Jan. 15, 2021. See: ISR.

The State Intellectual Property Office of People's Republic of China, First Search issued in corresponding Application No. 2020102614395 (translation not available).

* cited by examiner

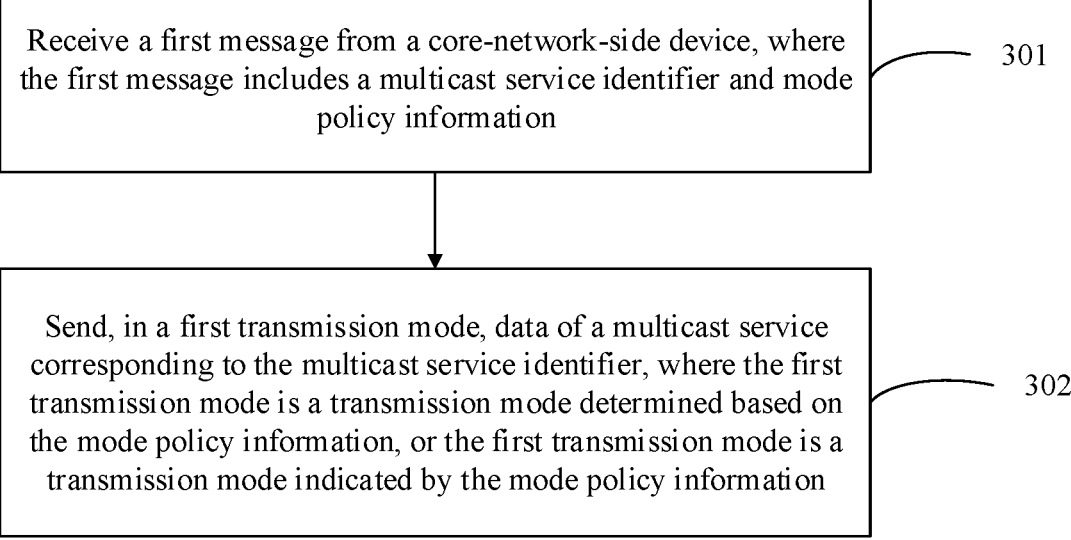

Receive a first message from a core-network-side device, where the first message includes a multicast service identifier and mode policy information ⟶ 301

Send, in a first transmission mode, data of a multicast service corresponding to the multicast service identifier, where the first transmission mode is a transmission mode determined based on the mode policy information, or the first transmission mode is a transmission mode indicated by the mode policy information ⟶ 302

FIG. 3

Send a first message to an access-network-side device, where the first message includes a multicast service identifier and mode policy information, and the mode policy information is used for determining or indicating a transmission mode of a multicast service corresponding to the multicast service identifier ⟶ 401

SERVICE TRANSMISSION METHOD, SERVICE TRANSMISSION MODE CONFIGURATION METHOD, AND RELATED DEVICE

CROSS-REFERENCE TO RELATED APPLICATIONS

This application is a continuation of International Application No. PCT/CN2021/085175, filed on Apr. 2, 2021, which claims priority to Chinese Patent Application No. 202010261439.5, filed in China on Apr. 3, 2020, which is incorporated herein by reference in its entirety.

TECHNICAL FIELD

The present disclosure relates to the field of communications technologies, and in particular, to a service transmission method, a service transmission mode configuration method, and a related device.

BACKGROUND

Multimedia broadcast and multicast services (Multimedia Broadcast and Multicast Service, MBMS) in long term evolution (Long Term Evolution, LTE) support broadcast or multicast transmission in both an MBMS single frequency network (Multimedia Broadcast multicast service Single Frequency Network, MB SFN) mode and a single-cell point-to-multipoint (Single Cell Point to Multipoint, SC-PTM) mode. In the two modes, control information related to multicast services is sent in a broadcast manner over an air interface and data information is sent in a broadcast or multicast manner over an air interface. In a case of switching between multicast and unicast, a unicast connection has to be established from a core network to a radio access network (Radio Access Network, RAN), resulting in a long delay.

For multicast services in new radio (New Radio, NR), a RAN side may send data of a multicast service to user equipment (User Equipment, UE) in a unicast manner or a multicast manner. However, in the related art, a transmission mode of multicast services that is to be selected by the RAN side is usually determined only based on a statistical result of multicast service demands on the RAN side. This features a relatively insufficient decision-making basis, and it is also likely to make transmission of multicast services difficult to meet quality of service requirements, such as reliability.

SUMMARY

Embodiments of the present disclosure provide a service transmission method, a service transmission mode configuration method, and a related device.

According to a first aspect of the present disclosure, a service transmission method, applied to an access-network-side device, is provided. The method includes:

receiving a first message from a core-network-side device, where the first message includes a multicast service identifier and mode policy information; and sending, in a first transmission mode, data of a multicast service corresponding to the multicast service identifier, where the first transmission mode is a transmission mode determined based on the mode policy information, or the first transmission mode is a transmission mode indicated by the mode policy information.

According to a second aspect of the present disclosure, a service transmission mode configuration method, applied to a core-network-side device, is provided. The method includes:

sending a first message to an access-network-side device, where the first message includes a multicast service identifier and mode policy information, and the mode policy information is used for determining or indicating a transmission mode of a multicast service corresponding to the multicast service identifier.

According to a third aspect of the present disclosure, an access-network-side device is provided. The access-network-side device includes:

a first receiving module, configured to receive a first message from a core-network-side device, where the first message includes a multicast service identifier and mode policy information; and a first sending module, configured to send, in a first transmission mode, data of a multicast service corresponding to the multicast service identifier, where the first transmission mode is a transmission mode determined based on the mode policy information, or the first transmission mode is a transmission mode indicated by the mode policy information.

According to a fourth aspect of the present disclosure, a core-network-side device is provided. The core-network-side device includes:

a fifth sending module, configured to send a first message to an access-network-side device, where the first message includes a multicast service identifier and mode policy information, and the mode policy information is used for determining or indicating a transmission mode of a multicast service corresponding to the multicast service identifier.

According to a fifth aspect of the present disclosure, an access-network-side device is provided, which includes a processor, a memory, and a computer program stored in the memory and capable of running on the processor, where when the computer program is executed by the processor, the steps of the service transmission method according to the first aspect are implemented.

According to a sixth aspect of the present disclosure, a core-network-side device is provided, which includes a processor, a memory, and a computer program stored in the memory and capable of running on the processor, where when the computer program is executed by the processor, the steps of the service transmission mode configuration method according to the second aspect are implemented.

According to a seventh aspect of the present disclosure, a computer-readable storage medium is provided, where the computer-readable storage medium stores a computer program, and when the computer program is executed by a processor, the steps of the service transmission method according to the first aspect are implemented, or the steps of the service transmission mode configuration method according to the second aspect are implemented.

In the embodiments of the present disclosure, the first message is received from the core-network-side device, where the first message includes the multicast service identifier and the mode policy information; and the data of the multicast service corresponding to the multicast service identifier is sent in the first transmission mode, where the first transmission mode is a transmission mode determined based on the mode policy information, or the first transmission mode is a transmission mode indicated by the mode policy information. In this way, the data of the multicast service corresponding to the multicast service identifier is sent in the transmission mode determined based on or indicated by the mode policy information sent by the core-network-side device. This not only provides a decision-making basis different from that in the related art for determining the transmission mode of the multicast service, but also makes sending of the multicast service better satisfy the quality of service requirements.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may derive other drawings from these accompanying drawings without creative efforts.

FIG. 3 is a flowchart of a service transmission method according to an embodiment of the present disclosure;

FIG. 4 is a flowchart of a service transmission mode configuration method according to an embodiment of the present disclosure;

DESCRIPTION OF EMBODIMENTS

Figure 1:
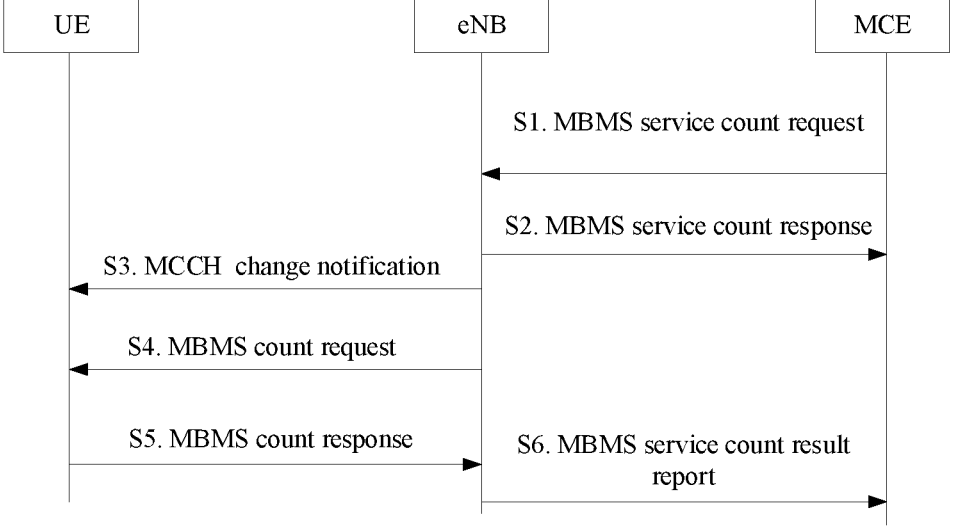
FIG. 1 is a flowchart of collecting statistics about a MBMS service subscriber quantity according to an embodiment of the present disclosure.

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In the specification and claims of this application, the terms such as "first" and "second" are intended to distinguish between similar objects but do not necessarily indicate a specific order or sequence. It should be understood that the digit used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. In addition, the use of "and/or" in the specification and claims represents presence of at least one of the connected objects. For example, A and/or B and/or C represents the following seven cases: A alone, B alone, C alone, both A and B, both B and C, both A and C, and all of A, B, and C.

For ease of understanding, the following describes some content included in the embodiments of the present disclosure.

1. Multimedia Broadcast and Multicast Service (Multimedia Broadcast and Multicast Service, MBMS) or Multicast Broadcast Service (Multicast Broadcast Service, MBS)

In a long term evolution (Long Term Evolution, LTE) system, the MBMS service may be sent in the following two modes:

MBMS/MBS transmission mode 1: transmitting through a physical multicast channel (Physical Multicast Channel, PMCH) in an MBMS single-frequency network (Multimedia Broadcast multicast service Single Frequency Network, MBSFN) subframe. Control information may be transmitted by using system information (for example, SIB13) and a multicast control channel (Multicast Control Channel, MCCH), and data may be transmitted by using an MTCH (Multicast Traffic Channel, multicast traffic channel).

MBMS/MBS transmission mode 2: sending through a physical downlink shared channel (Physical Downlink Shared Channel, PDSCH) scheduled by a physical downlink control channel (Physical Downlink Control Channel, PDCCH). Control information may be sent by using system information (for example, SIB20) and a single-cell multicast control channel (Single Cell Multicast Control Channel, SC-MCCH), and data may be sent by using a single-cell multicast traffic channel (Single Cell Multicast Traffic Channel, SC-MTCH). The SC-MCCH is sent through a PDSCH scheduled by a single-cell radio network temporary identity (Single Cell Radio Network Temporary Identity, SC-RNTI) PDCCH, and the SC-MTCH is sent through a PDSCH scheduled by a group radio network temporary identity (Group Radio Network Temporary Identity, G-RNTI) PDCCH.

2. Counting Function in LTE

In LTE, a multi-cell/multicast coordination entity (Multi-cell/Multicast Coordination Entity, MCE) triggers a radio access network (Radio Access Network, RAN) side to collect statistics about a subscriber quantity, and the MCE determines, based on a received statistical result, whether to use single-cell point-to-multipoint (Single Cell Point to Multipoint, SC-PTM) (that is, single-cell multicast) or MBSFN (that is, multi-cell multicast). That is, the statistical result is not fed back to a core-network node. For a multicast service, the core network still maintains a multicast data channel, and only the RAN side determines, based on the statistical result, to send data received from the core network in a single-cell multicast mode or a multi-cell multicast mode.

Alternatively, statistics collection on the subscriber quantity of MBMS service subscribers may include the following steps, as shown in FIG. 1:

Step S1: The MCE sends an MBMS service count request to an eNB.

Step S2: The eNB returns an MBMS service count response to the MCE.

Step S3: The eNB sends an MCCH change notification to UE.

Step S4: The eNB sends an MBMS count request to the UE.

Step S5: The UE returns an MBMS count response to the eNB.

Step S6: The eNB reports an MBMS service count result to the MCE.

Figure 2:
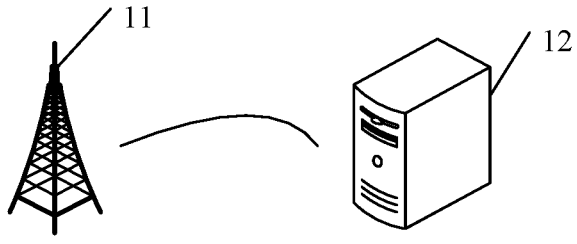
FIG. 2 is a structural diagram of a network system to which the embodiments of the present disclosure are applicable.

Referring to FIG. 2, FIG. 2 is a structural diagram of a network system to which the embodiments of the present disclosure are applicable. As shown in FIG. 2, the network system includes an access-network-side device 11 and a core-network-side device 12. The access-network-side device 11 may be a base station, such as a macro station, an LTE eNB, a 5G NR NB, or a gNB; or the access-network-side device 11 may be a small cell, such as a low power node (Low Power Node, LPN) pico or femto; or the access-network-side device 11 may be an access point (Access Point, AP). A specific type of the access-network-side device 11 is not limited in the embodiments of the present disclosure.

It should be noted that a service transmission method provided by the embodiments of the present disclosure may be executed by the access-network-side device 11, and a service transmission mode configuration method provided by the embodiments of the present disclosure may be executed by the core-network-side device 12. For details, refer to the following description.

An embodiment of the present disclosure provides a service transmission method, applied to an access-network-side device. Referring to FIG. 3, FIG. 3 is a flowchart of a service transmission method according to an embodiment of the present prevention. As shown in FIG. 3, the method includes the following steps.

Step 301: Receive a first message from a core-network-side device, where the first message includes a multicast service identifier and mode policy information.

In this embodiment, the multicast service identifier may be any information capable of identifying a multicast service, for example, a temporary mobile group identity (Temporary Mobile Group Identity, TMGI). A multicast service corresponding to the multicast service identifier may include but is not limited to an MBMS service or an MBS service.

The mode policy information may be used to determine or indicate a transmission mode of the multicast service corresponding to the multicast service identifier, and the mode policy information may include but is not limited to one or more of a transmission mode type, quality of service requirement information, and the like. Optionally, the mode policy information may be information determined by the core-network-side device based on a quality of service requirement of the multicast service corresponding to the multicast service identifier, a statistical result of joined UEs of the multicast service, and the like.

Step 302: Send, in a first transmission mode, data of the multicast service corresponding to the multicast service identifier, where the first transmission mode is a transmission mode determined based on the mode policy information, or the first transmission mode is a transmission mode indicated by the mode policy information.

In this embodiment, the access-network-side device may determine, based on the mode policy information sent by the core-network-side device, a transmission mode for sending the data of the multicast service corresponding to the multicast service identifier. The transmission mode of the multicast service may include a unicast mode, a multicast mode, and the like. The unicast mode may include a point-to-point (Point to Point, PTP) mode, and the multicast mode may include a point-to-multipoint (Point to Multipoint, PTM) mode.

For example, in a case that a protocol predefines that the mode policy information sent by the core-network-side device serves as reference information (also referred to as a reference basis), the access-network-side device may determine, with reference to the mode policy information, the first transmission mode for sending the data of the multicast service corresponding to the multicast service identifier. In a case that the protocol predefines that the mode policy information sent by the core-network-side device serves as mandatory indication information (also referred to as an only basis), the access-network-side device may directly use the first transmission mode indicated by the mode policy information to send the data of the multicast service corresponding to the multicast service identifier. Alternatively, the core-network-side device may indicate to the access-network-side device whether the mode policy information is used as reference information or mandatory indication information, so that the access-network-side device may determine, according to the indication of the core-network-side device, whether to determine, with reference to the mode policy information, a transmission mode for sending the data of the multicast service corresponding to the multicast service identifier, or to directly use a transmission mode indicated by the mode policy information to send the data of the multicast service corresponding to the multicast service identifier.

It should be noted that, in a case that the access-network-side device determines, based on the mode policy information, the first transmission mode for sending the data of the multicast service, the access-network-side device may determine, only based on the mode policy information, a transmission mode of the data of the multicast service. For example, in a case that the mode policy information includes quality of service requirement information, if a reliability requirement in the quality of service requirement information is relatively high, the data of the multicast service may be sent in the PTP mode; otherwise, the data of the multicast service may be sent in the PTM mode. Alternatively, the access-network-side device may determine the transmission mode of the data of the multicast service based on both the mode policy information and other mode parameters, for example, may determine, based on the mode policy information, a statistical result of joined UEs of the multicast service, a resource status of the access-network-side device, and the like, the transmission mode of the data of the multicast service.

In the service transmission method provided by this embodiment of the present disclosure, the first message is received from the core-network-side device, where the first message includes the multicast service identifier and the mode policy information; and the data of the multicast service corresponding to the multicast service identifier is sent in the first transmission mode, where the first transmission mode is a transmission mode determined based on the mode policy information, or the first transmission mode is a transmission mode indicated by the mode policy information. In this way, the data of the multicast service corresponding to the multicast service identifier is sent in the transmission mode determined based on or indicated by the mode policy information sent by the core-network-side device. This not only provides a decision-making basis different from that in the related art for determining the transmission mode of the multicast service, but also makes sending of the multicast service better satisfy the quality of service requirements.

Optionally, the mode policy information includes a transmission mode type or quality of service requirement information.

In one implementation, the core-network-side device may explicitly indicate, to the access-network-side device, the transmission mode of the data of the multicast service, for example, the transmission mode type such as a PTP mode or a PTM mode may be directly carried in the first message.

Correspondingly, the access-network-side device may directly use a transmission mode indicated by the transmission mode type to send the data of the multicast service, that is, the transmission mode type is used as the only basis for determining the transmission mode of the multicast service. For example, if the transmission mode type is a PTP mode, the data of the multicast service is sent in the PTP mode; or if the transmission mode type is a PTM mode, the data of the multicast service is sent in the PTM mode. Alternatively, the access-network-side device may determine, with reference to the transmission mode type, a transmission mode for sending the data of the multicast service, that is, the transmission mode type is used as a reference basis for determining the transmission mode of the multicast service. For example, the transmission mode type is a PTM mode; however, the access-network-side device determines based on both the transmission mode type and the subscriber quantity of the multicast service to send the multicast service in the PTP mode.

In another implementation, the core-network-side device may implicitly indicate, to the access-network-side device, the transmission mode of the data of the multicast service. For example, the first message may carry quality of service requirement information, and a correspondence between different quality of service requirement information and different transmission modes may be pre-established. In this way, a transmission mode corresponding to the quality of service requirement information may be obtained based on the correspondence and the quality of service requirement information carried in the first message.

Correspondingly, the access-network-side device may directly use the transmission mode implicitly indicated by the quality of service requirement information to send the data of the multicast service, that is, the transmission mode type is used as the only basis for determining the transmission mode of the multicast service. For example, if the transmission mode implicitly indicated by the quality of service requirement information is a PTP mode, the PTP mode is used for sending the data of the multicast service; or if the transmission mode implicitly indicated by the quality of service requirement information is a PTM mode, the PTM mode is used for sending the data of the multicast service. Alternatively, the access-network-side device may determine, with reference to the quality of service requirement information, a transmission mode for sending the data of the multicast service, that is, the quality of service requirement information is used as a reference basis for determining the transmission mode of the multicast service.

For example, a transmission mode implicitly indicated by the quality of service requirement information is a PTM mode; however, the access-network-side device determines based on both the quality of service requirement information and a radio resource status of the access-network-side device to send the multicast service in a PTP mode.

Optionally, the first message further includes a decision indication.

In a case that the decision indication is a first indication, the first transmission mode is a transmission mode determined based on the mode policy information;

and/or in a case that the decision indication is a second indication, the first transmission mode is a transmission mode indicated by the mode policy information.

In this embodiment, the decision indication may be used to indicate whether the mode policy information is used as reference information for determining the transmission mode of the multicast service or used as mandatory indication information. Alternatively, in a case that the decision indication is the first indication, the access-network-side device may determine, with reference to the mode policy information, a transmission mode for sending the data of the multicast service; and in a case that the decision indication is the second indication, the access-network-side device may directly use the transmission mode indicated by the mode policy information to send the data of the multicast service.

Optionally, in this embodiment, alternatively, in a case that the decision indication is the first indication, the first transmission mode is a transmission mode determined based on the mode policy information; however, in a case that the first message carries no decision indication, the first transmission mode is a transmission mode indicated by the mode policy information. Alternatively, in a case that the decision indication is the second indication, the first transmission mode is a transmission mode indicated by the mode policy information; however, in a case that the first message carries no decision indication, the first transmission mode is a transmission mode determined based on the mode policy information.

It should be noted that, the first indication and second indication may be any two different pieces of indication information. For example, the first indication and the second indication may be different values of a same indicator bit or different indicator bits.

In this embodiment, the decision indication is used to indicate whether the mode policy information is used as reference information for determining the transmission mode of the multicast service or used as mandatory indication information, thereby improving flexibility and properness of transmission mode determining.

Optionally, in this embodiment, the protocol may predefine that the access-network-side device may determine a transmission mode with reference to the mode policy information to send the data of the multicast service; therefore, in a case that the access-network-side device receives the mode policy information, a transmission mode may be determined with reference to the mode policy information, and the data of the multicast service may be sent in the transmission mode. Alternatively, the protocol predefines that the access-network-side device uses a transmission mode indicated by the mode policy information to send the data of the multicast service; therefore, in a case that the access-network-side device receives the mode policy information, the transmission mode indicated by the mode policy information may be directly used to send the data of the multicast service.

Optionally, before the step 301, that is, before the receiving a first message from a core-network-side device, the method may further include:

receiving a second message from the core-network-side device, where the second message is used to instruct the access-network-side device to report a statistical result of joined UEs of the multicast service; and sending the statistical result of joined UEs of the multicast service to the core-network-side device.

In this embodiment, in a case that the second message used for instructing the access-network-side device to report a statistical result of joined UEs of the multicast service is received from the core-network-side device, the access-network-side device may send the statistical result of joined UEs of the multicast service to the core-network-side device, so that the core-network-side device may determine the mode policy information based on the statistical result of joined UEs of the multicast service.

It should be noted that in a case that the second message used for instructing the access-network-side device to report the statistical result of joined UEs of the multicast service is received from the core-network-side device, the access-network-side device may first collect statistics about the subscriber quantity of the multicast service to obtain a statistical result of joined UEs of the multicast service, and then report a currently obtained statistical result of joined UEs of the multicast service to the core-network-side device; or in a case that the second message used for instructing the access-network-side device to report the statistical result of joined UEs of the multicast service is received from the core-network-side device, the access-network-side device may directly report a historical statistical result of joined UEs of the multicast service.

Optionally, the access-network-side device may proactively report the statistical result of joined UEs of the multicast service to the core-network-side device. For example, each time statistics collection on the subscriber quantity of the multicast service is performed, the access-network-side device may proactively report the statistical result of joined UEs of the multicast service to the core-network-side device.

Optionally, the first transmission mode is a transmission mode determined based on the mode policy information and a first mode parameter.

The first mode parameter includes at least one of the following: the statistical result of joined UEs of the multicast service and radio resource information of the access-network-side device.

In this embodiment, the radio resource information of the access-network-side device may be information that may reflect a radio resource status of the access-network-side device, for example, a quantity of radio resources of the access-network-side device, quality of radio resources, and a status of radio resources.

In this embodiment, the access-network-side device may determine the transmission mode of the multicast service based on both the mode policy information and the first mode parameter, thereby improving properness in determining the transmission mode of the multicast service, and further improving service quality of the multicast service.

Optionally, in a case that the first mode parameter includes a statistical result of joined UEs of the multicast service, the method may further include:

sending a statistical indication of the multicast service through an air interface; and collecting statistics about the subscriber quantity of the multicast service based on response information of the statistical indication, to obtain a statistical result of joined UEs of the multicast service.

For example, the statistical indication of the multicast service may be sent to a plurality of UEs through air interfaces, and then statistics collection about the subscriber quantity of the multicast service may be performed based on response information of the statistical indication of the multicast service from the UEs.

Optionally, the method may further include:

sending a third message to the core-network-side device, where the third message carries the multicast service identifier and information about the first transmission mode.

In this embodiment, the access-network-side device may alternatively feed back to the core-network-side device a transmission mode used by the access-network-side device for sending the data of the multicast service corresponding to the multicast service identifier, so as to ensure consistent understanding on the transmission mode of the multicast service corresponding to the multicast service identifier between the access-network-side device and the core-network-side device.

Optionally, the transmission mode of the multicast service includes a point-to-point PTP mode and a point-to-multipoint PTM mode.

It should be noted that the foregoing embodiments may be properly combined based on actual requirements, which is not limited in this embodiment.

An embodiment of the present disclosure further provides a service transmission mode configuration method, applied to a core-network-side device. Referring to FIG. 4, FIG. 4 is a flowchart of a service transmission mode configuration method according to an embodiment of the present prevention. As shown in FIG. 4, the method includes the following step.

Step 401: Send a first message to an access-network-side device, where the first message includes a multicast service identifier and mode policy information, and the mode policy information is used for determining or indicating a transmission mode of a multicast service corresponding to the multicast service identifier.

In this embodiment, the multicast service identifier may be any information for identifying a multicast service, for example, a TMGI. A multicast service corresponding to the multicast service identifier may include but is not limited to an MBMS service or an MBS service.

The mode policy information may be used for determining the transmission mode of the multicast service corresponding to the multicast service identifier, that is, the mode policy information may be used as reference information (also referred to as a reference basis) for determining the transmission mode of the multicast service; or the mode policy information may be used to indicate the transmission mode of the multicast service corresponding to the multicast service identifier, that is, the mode policy information may be used as mandatory indication information (also referred to as the only basis) for determining the transmission mode of the multicast service.

The mode policy information may include but is not limited to one or more of a transmission mode type, quality of service requirement information, and the like. Optionally, the mode policy information may be information determined by the core-network-side device based on a quality of service requirement of the multicast service corresponding to the multicast service identifier, a statistical result of joined UEs of the multicast service, and the like.

The transmission mode of the multicast service may include a unicast mode, a multicast mode, and the like. The unicast mode may include a PTP mode, and the multicast mode may include a PTM mode.

In the service transmission mode configuration method provided by this embodiment of the present disclosure, the core-network-side device sends the multicast service identifier and the mode policy information to the access-network-side device, so that the access-network-side device may determine, based on the mode policy information, a transmission mode to send data of the multicast service corresponding to the multicast service identifier, or send, based on a transmission mode indicated by the mode policy information, data of the multicast service corresponding to the multicast service identifier, thereby making sending of the multicast service better satisfy the quality of service requirement.

Optionally, the mode policy information includes a transmission mode type or quality of service requirement information.

In one implementation, the core-network-side device may explicitly indicate, to the access-network-side device, the transmission mode of the data of the multicast service, for example, the transmission mode type such as a PTP mode or a PTM mode may be directly carried in the first message.

In another implementation the core-network-side device may implicitly indicate, to the access-network-side device, the transmission mode of the data of the multicast service. For example, the first message may carry quality of service requirement information, and a correspondence between different quality of service requirement information and different transmission modes may be pre-established. In this way, a transmission mode corresponding to the quality of service requirement information may be obtained based on the correspondence and the quality of service requirement information carried in the first message.

Optionally, the first message further includes a decision indication.

In a case that the decision indication is a first indication, a transmission mode used for sending the multicast service by the access-network-side device is a transmission mode determined based on the mode policy information; and/or in a case that the decision indication is a second indication, a transmission mode used for sending the multicast service by the access-network-side device is a transmission mode indicated by the mode policy information.

In this embodiment, the decision indication may be used to indicate whether the mode policy information is used as reference information for determining the transmission mode of the multicast service or used as mandatory indication information. Alternatively, in a case that the decision indication is the first indication, the access-network-side device may determine, with reference to the mode policy information, a transmission mode for sending the data of the multicast service; and in a case that the decision indication is the second indication, the access-network-side device may directly use the transmission mode indicated by the mode policy information to send the data of the multicast service.

Optionally, in this embodiment, alternatively, in a case that the decision indication is the first indication, the first transmission mode is a transmission mode determined based on the mode policy information; however, in a case that the first message carries no decision indication, the first transmission mode is a transmission mode indicated by the mode policy information. Alternatively, in a case that the decision indication is the second indication, the first transmission mode is a transmission mode indicated by the mode policy information; however, in a case that the first message carries no decision indication, the first transmission mode is a transmission mode determined based on the mode policy information.

It should be noted that, the first indication and second indication may be any two different pieces of indication information. For example, the first indication and the second indication may be different values of a same indicator bit or different indicator bits.

In this embodiment, the decision indication is used to indicate whether the mode policy information is used as reference information for determining the transmission mode of the multicast service or used as mandatory indication information, thereby improving flexibility and properness of transmission mode determining.

Optionally, the mode policy information is determined based on a second mode parameter.

The second mode parameter includes at least one of the following: quality of service requirement information of the multicast service and a statistical result of joined UEs of the multicast service.

In this embodiment, the quality of service requirement information of the multicast service may include but is not limited to reliability requirement information, delay requirement information, and the like.

In this embodiment, the core-network-side device may determine the mode policy information based on at least one of the quality of service requirement information of the multicast service and the statistical result of joined UEs of the multicast service, and then the access-network-side device determines the transmission mode of the multicast service based on the mode policy information, thereby improving properness in determining the transmission mode of the multicast service, and making sending of the multicast service better satisfy the quality of service requirement.

Optionally, in a case that the second mode parameter includes a statistical result of joined UEs of the multicast service, before the sending a first message to an access-network-side device, the method may further include:

sending a second message to the access-network-side device, where the second message is used to instruct the access-network-side device to report a statistical result of joined UEs of the multicast service; and receiving the statistical result of joined UEs of the multicast service from the access-network-side device.

In this embodiment, in a case that the core-network-side device sends, to the access-network-side device, the second message for instructing the access-network-side device to report a statistical result of joined UEs of the multicast service, a statistical result of joined UEs of the multicast service may be received from the access-network-side device, thereby saving resources.

Optionally, the method may further include:

receiving a third message from the access-network-side device, where the third message carries the multicast service identifier and information about a first transmission mode, and the first transmission mode is a transmission mode used for sending the multicast service by the access-network-side device.

In this embodiment, the core-network-side device may receive a transmission mode fed back by the access-network-side device and used by the access-network-side device to send the data of the multicast service corresponding to the multicast service identifier, so as to ensure consistent understanding on the transmission mode of the multicast service corresponding to the multicast service identifier between the access-network-side device and the core-network-side device.

Optionally, the transmission mode of the multicast service includes a point-to-point PTP mode and a point-to-multipoint PTM mode.

It should be noted that the foregoing embodiments may be properly combined based on actual requirements, which is not limited in this embodiment.

This embodiment of the present disclosure is described below with reference to examples.

EXAMPLE 1

Figure 5:
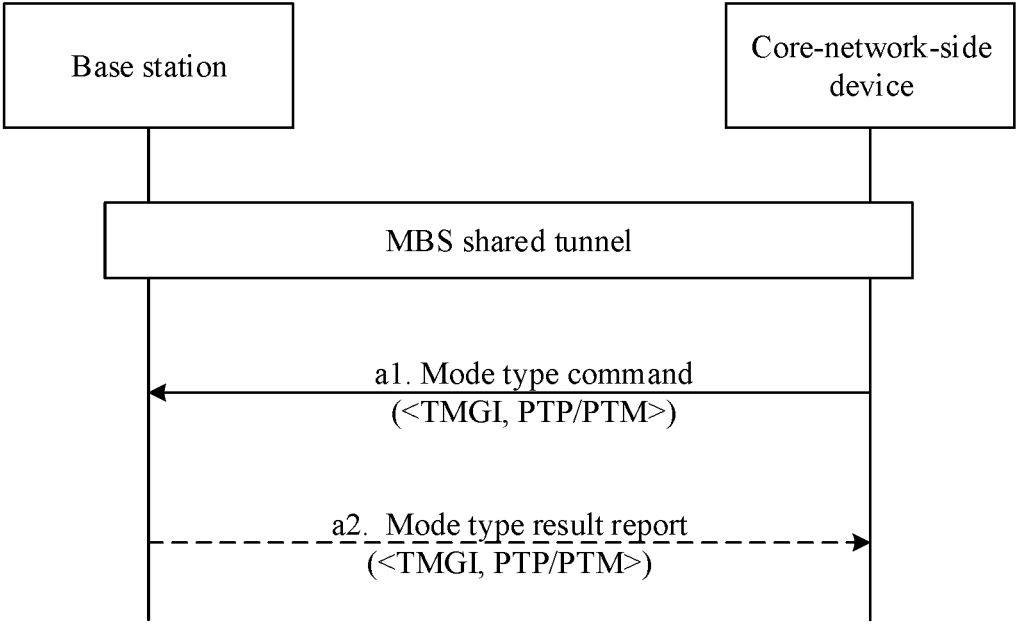
FIG. 5 is a flowchart of another service transmission method according to an embodiment of the present disclosure.

Referring to FIG. 5, an MBS shared tunnel (that is, a Shared Tunnel) is established between a base station (that is, a gNB) and a core network (Core Network, CN)-side device. The service transmission method in this embodiment of the present disclosure may include the following steps.

Step a1: The core-network-side device sends a mode type command (Mode Type Command) to the base station.

The mode type command may include a multicast service identifier (for example, a TMGI) and a transmission mode type, such as a PTP mode or a PTM mode. The core-network-side device may indicate to the base station whether a multicast service corresponding to the multicast service identifier is to be sent in a PTP mode or a PTM mode.

Correspondingly, after receiving the mode type command, the base station may use, based on the multicast service identifier, a transmission mode indicated by the transmission mode type to send data of the multicast service corresponding to the multicast service identifier on the RAN side.

Step a2: The base station sends a mode type result report (Mode Type Result Report) message to the core-network-side device.

The mode type result report message may include a multicast service identifier and a transmission mode of a multicast service corresponding to the multicast service identifier on the RAN side, for example, a PTP mode or a PTM mode.

It should be noted that the mode type result report message may be sent or not sent.

EXAMPLE 2

Figure 6:
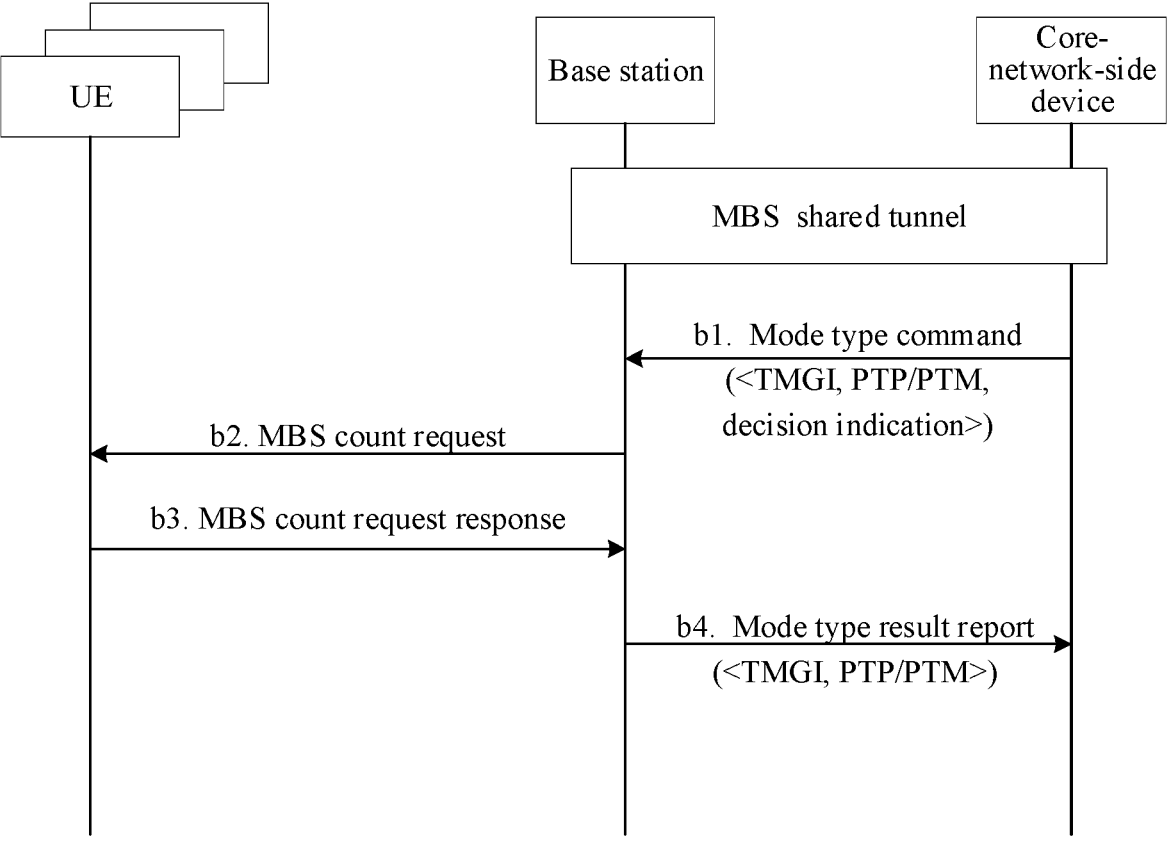
FIG. 6 is a flowchart of another service transmission method according to an embodiment of the present disclosure.

Referring to FIG. 6, an MBS shared tunnel is established between a base station and a core-network-side device. The service transmission method in this embodiment of the present disclosure may include the following steps.

Step b1: The core-network-side device sends a mode type command (Mode Type Command) to the base station.

The mode type command may include a multicast service identifier (for example, a TMGI), a transmission mode type (for example, a PTP mode or a PTM mode), and a decision indication (Indication)

The decision indication is used to indicate that the PTP mode or PTM mode indicated by the mode type command is for reference only and is not mandatory.

Step b2: The base station sends an MBS count request (MBS CountRequest) message to UEs.

The MBS count request message may include information such as a multicast service identifier. After receiving the MBS count request message, the UEs determine whether the UEs requires the multicast service.

Step b3: The UEs send an MBS count request response (MBS CountRequest Response) message to the base station.

Alternatively, based on the MBS count request response message received by the base station, the base station may learn how many UEs require the multicast service. Further, the base station may determine a final transmission mode of the multicast service based on information such as a demand status of the multicast service on the RAN side, the mode type command, and a radio resource status of the base station.

Step b4: The base station sends a mode type result report (Mode Type Result Report) message to the core network.

The mode type result report message may include a multicast service identifier and a transmission mode of a multicast service corresponding to a multicast service identifier on the RAN side.

Optionally, after receiving the mode type result report message, the core-network-side device may record the multicast service identifier and the transmission mode of the multicast service corresponding to the multicast service identifier on the RAN side.

EXAMPLE 3

Figure 7:
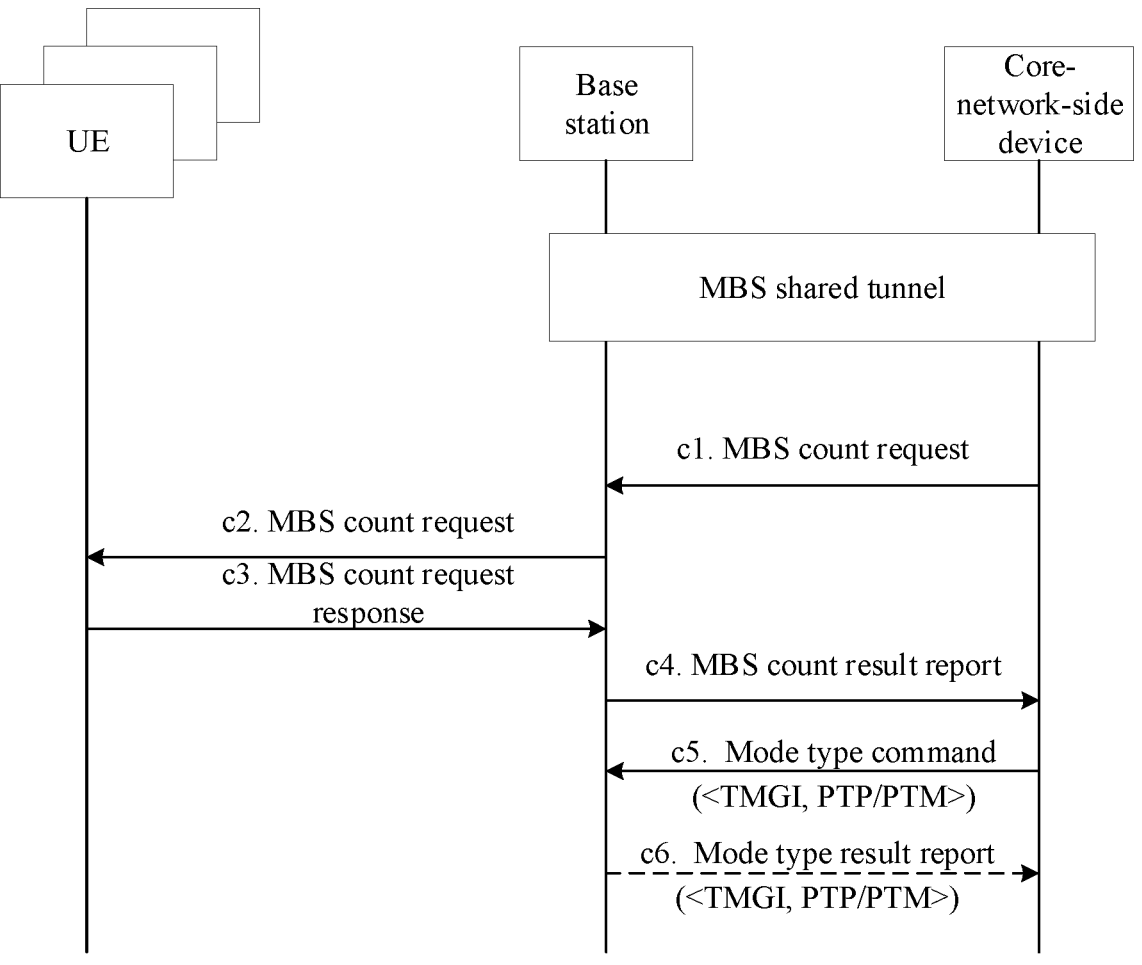
FIG. 7 is a flowchart of another service transmission method according to an embodiment of the present disclosure.

Referring to FIG. 7, an MBS shared tunnel is established between a base station and a core-network-side device. The service transmission method in this embodiment of the present disclosure may include the following steps.

Step c1: The core-network-side device sends an MBS count request (MBS countRequest) message to the base station.

The MBS count request message may include information such as a multicast service identifier, and the MBS count request message may trigger the base station to perform statistics collection on multicast service demands on the RAN side, that is, statistics collection on a subscriber quantity of the multicast service.

Step c2: The base station sends an MBS count request message to UEs.

The MBS count request message includes information such as a multicast service identifier. After receiving the MBS count request message, the UEs determine whether the UEs require the multicast service.

Step c3: The UEs send an MBS count request response (MBS CountRequest Response) message to the base station.

Alternatively, the base station may learn how many UEs require the multicast service based on the MBS count request response message received by the base station.

Step c4: The base station sends an MBS count result report (MBS countResult Report) message to the core-network-side device, so as to send a statistical result of multicast service demands on the RAN side to the core-network-side device.

Step c5: After receiving the MBS count result report message, the core-network-side device may send a mode type command (Mode Type Command) to the base station based on the multicast service demands on the RAN side, a quality of service requirement of the multicast service, and the like.

The mode type command may include a multicast service identifier (for example, a TMGI) and a transmission mode type, such as a PTP mode or a PTM mode. The core-network-side device may indicate to the base station whether the multicast service corresponding to the multicast service identifier is to be sent in a PTP mode or a PTM mode.

Correspondingly, after receiving the mode type command, the base station may use, based on the multicast service identifier, a transmission mode indicated by the transmission mode type to send data of the multicast service corresponding to the multicast service identifier on the RAN side.

Step c6: The base station sends a mode type result report (Mode Type Result Report) message to the core-network-side device.

The mode type result report message may include a multicast service identifier and a transmission mode of a multicast service corresponding to the multicast service identifier on the RAN side, for example, a PTP mode or a PTM mode.

It should be noted that the mode type result report message may be sent or not sent.

To sum up, in the service transmission method provided in this embodiment of the present disclosure, influence and assistance of the core-network-side device in selection of the transmission mode on the RAN side are mainly considered. Alternatively, the core-network-side device performs evaluation on the quality of service requirement of the multicast service and then provides some mandatory or auxiliary indications to the base station. This can not only implement completeness of selection of the transmission mode of the multicast service on the RAN side, but also implement determining of the transmission mode the multicast service based on an indication of the core-network-side device, thereby ensuring that sending of the data of the multicast service satisfies some quality of service requirements, such as reliability.

Figure 8:
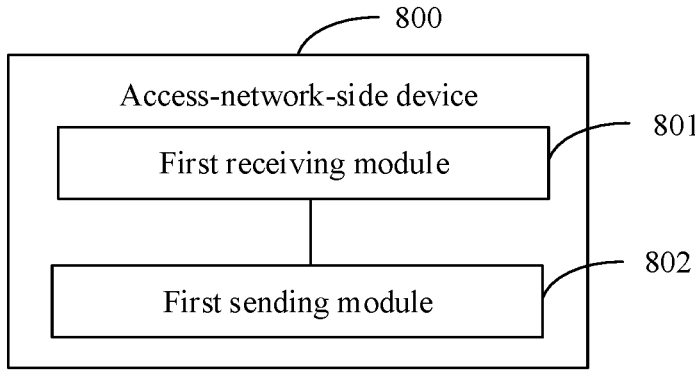
FIG. 8 is a structural diagram of an access-network-side device according to an embodiment of the present disclosure.

Referring to FIG. 8, FIG. 8 is a structural diagram of an access-network-side device according to an embodiment of the present disclosure. As shown in FIG. 8, the access-network-side device 800 includes:

a first receiving module 801, configured to receive a first message from a core-network-side device, where the first message includes a multicast service identifier and mode policy information; and a first sending module 802, configured to send, in a first transmission mode, data of a multicast service corresponding to the multicast service identifier, where the first transmission mode is a transmission mode determined based on the mode policy information, or the first transmission mode is a transmission mode indicated by the mode policy information.

Optionally, the mode policy information includes a transmission mode type or quality of service requirement information.

Optionally, the first message further includes a decision indication.

In a case that the decision indication is a first indication, the first transmission mode is a transmission mode determined based on the mode policy information; and/or in a case that the decision indication is a second indication, the first transmission mode is a transmission mode indicated by the mode policy information.

Optionally, the access-network-side device further includes:

a second receiving module, configured to: before the first message is received from the core-network-side device, receive a second message from the core-network-side device, where the second message is used to instruct the access-network-side device to report a statistical result of joined UEs of the multicast service; and a second sending module, configured to send the statistical result of joined UEs of the multicast service to the core-network-side device.

Optionally, the first transmission mode is a transmission mode determined based on the mode policy information and a first mode parameter.

The first mode parameter includes at least one of the following: the statistical result of joined UEs of the multicast service and radio resource information of the access-network-side device.

Optionally, the access-network-side device further includes:

a third sending module, configured to: in a case that the first mode parameter includes the statistical result of joined UEs of the multicast service, send a statistical indication of the multicast service through an air interface; and a statistics collection module, configured to collect statistics about the subscriber quantity of the multicast service based on response information of the statistical indication, to obtain a statistical result of joined UEs of the multicast service.

Optionally, the access-network-side device further includes:

a fourth sending module, configured to send a third message to the core-network-side device, where the third message carries the multicast service identifier and information about the first transmission mode.

Optionally, the transmission mode of the multicast service includes a point-to-point PTP mode and a point-to-multi-point PTM mode.

The access-network-side device 800 provided in this embodiment of the present disclosure is capable of implementing the processes that are implemented by the access-network-side device in the foregoing method embodiments. To avoid repetition, details are not described herein again.

According to the access-network-side device 800 in this embodiment of the present disclosure, the first receiving module 801 is configured to receive the first message from the core-network-side device, where the first message includes the multicast service identifier and the mode policy information; and the first sending Module 802 is configured to send, in the first transmission mode, the data of the multicast service corresponding to the multicast service identifier, where the first transmission mode is a transmission mode determined based on the mode policy information, or the first transmission mode is a transmission mode indicated by the mode policy information. In this way, the data of the multicast service corresponding to the multicast service identifier is sent in the transmission mode determined based on or indicated by the mode policy information sent by the core-network-side device. This not only provides a decision-making basis different from that in the related art for determining the transmission mode of the multicast service, but also makes sending of the multicast service better satisfy the quality of service requirements.

Figure 9:
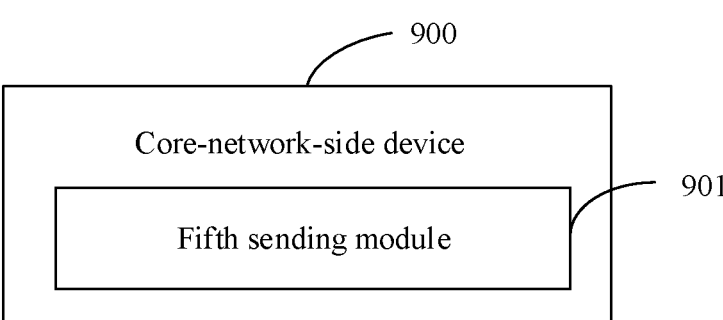
FIG. 9 is a structural diagram of a core-network-side device according to an embodiment of the present disclosure.

Referring to FIG. 9, FIG. 9 is a structural diagram of a core-network-side device according to an embodiment of the present disclosure. As shown in FIG. 9, the core-network-side device 900 includes:

a fifth sending module 901, configured to send a first message to an access-network-side device, where the first message includes a multicast service identifier and mode policy information, and the mode policy information is used for determining or indicating a transmission mode of a multicast service corresponding to the multicast service identifier.

Optionally, the mode policy information includes a transmission mode type or quality of service requirement information.

Optionally, the first message further includes a decision indication.

in a case that the decision indication is a first indication, a transmission mode used for sending the multicast service by the access-network-side device is a transmission mode determined based on the mode policy information;

and/or in a case that the decision indication is a second indication, a transmission mode used for sending the multicast service by the access-network-side device is a transmission mode indicated by the mode policy information.

Optionally, the mode policy information is determined based on a second mode parameter.

The second mode parameter includes at least one of the following: quality of service requirement information of the multicast service and a statistical result of joined UEs of the multicast service.

Optionally, the core-network-side device further includes: a sixth sending module, configured to: in a case that the second mode parameter includes the statistical result of joined UEs of the multicast service, before the first message is sent to the access-network-side device, send a second message to the access-network-side device, where the second message is used to instruct the access-network-side device to report a statistical result of joined UEs of the multicast service; and a third receiving module, configured to receive the statistical result of joined UEs of the multicast service from the access-network-side device.

Optionally, the core-network-side device further includes: a fourth receiving module, configured to receive a third message from the access-network-side device, where the third message carries the multicast service identifier and information about a first transmission mode, and the first transmission mode is a transmission mode used for sending the multicast service by the access-network-side device.

Optionally, the transmission mode of the multicast service includes a point-to-point PTP mode and a point-to-multipoint PTM mode.

The core-network-side device 900 provided in this embodiment of the present disclosure is capable of implementing the processes that are implemented by the core-network-side device in the foregoing method embodiments. To avoid repetition, details are not described herein again.

According to the core-network-side device 900 in this embodiment of the present disclosure, the fifth sending module 901 is configured to send the first message to the access-network-side device, where the first message includes a multicast service identifier and mode policy information, and the mode policy information is used for determining or indicating a transmission mode of a multicast service corresponding to the multicast service identifier. In this way, the access-network-side device may send the data of the multicast service based on the transmission mode determined based on or indicated by the mode policy information, thereby making sending of the multicast service better satisfy the quality of service requirement.

Figure 10:
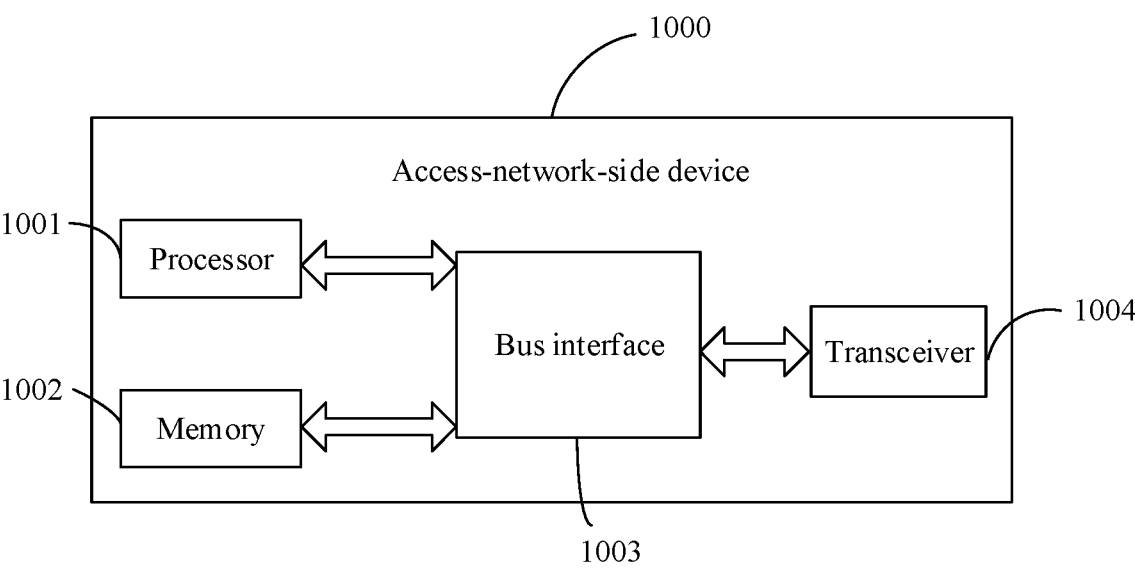
FIG. 10 is a structural diagram of another access-network-side device according to an embodiment of the present disclosure.

Referring to FIG. 10, FIG. 10 is a structural diagram of another access-network-side device according to an embodiment of the present disclosure. As shown in FIG. 10, the access-network-side device 1000 includes a processor 1001, a memory 1002, a bus interface 1003, and a transceiver 1004, where the processor 1001, the memory 1002, and the transceiver 1004 are all connected to the bus interface 1003.

In this embodiment of the present disclosure, the access-network-side device 1000 further includes: a computer program stored on the memory 1002 and capable of running on the processor 1001.

In this embodiment of the present disclosure, the transceiver 1004 is configured to:

receive a first message from a core-network-side device, where the first message includes a multicast service identifier and mode policy information; and send, in a first transmission mode, data of a multicast service corresponding to the multicast service identifier, where the first transmission mode is a transmission mode determined based on the mode policy information, or the first transmission mode is a transmission mode indicated by the mode policy information.

It should be understood that, in this embodiment of the present disclosure, the processor 1001 and the transceiver 1004 are capable of implementing the processes that are implemented by the access-network-side device in the foregoing method embodiments. To avoid repetition, details are not repeated herein.

Figure 11:
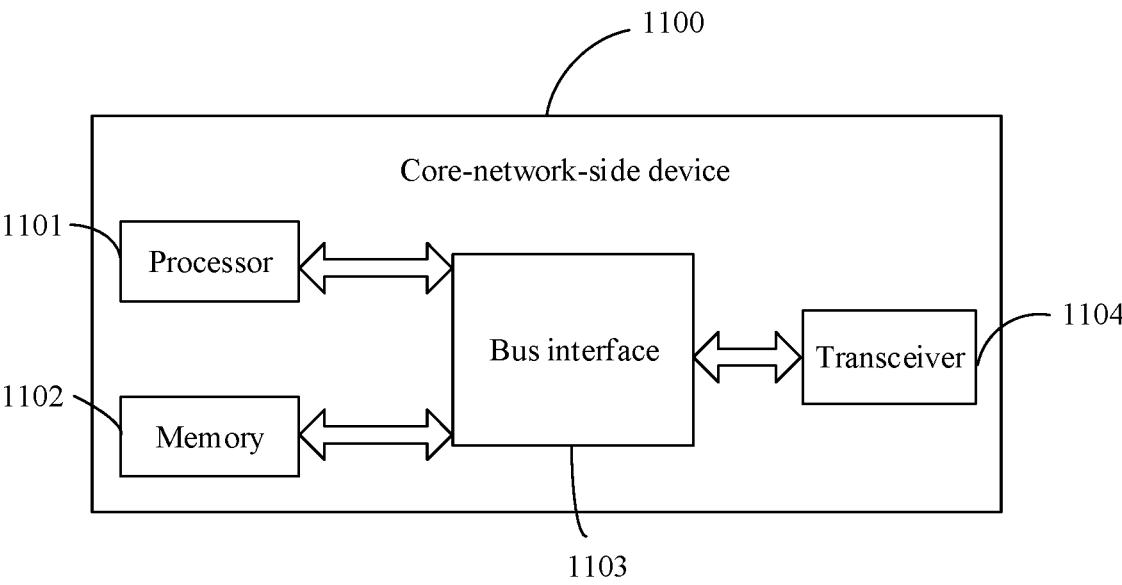
FIG. 11 is a structural diagram of another core-network-side device according to an embodiment of the present disclosure.

Referring to FIG. 11, FIG. 11 is a structural diagram of another core-network-side device according to an embodiment of the present disclosure. As shown in FIG. 11, the core-network-side device 1100 includes a processor 1101, a memory 1102, a bus interface 1103, and a transceiver 1104, where the processor 1101, the memory 1102, and the transceiver 1104 are all connected to the bus interface 1103.

In this embodiment of the present disclosure, the core-network-side device 1100 further includes: a computer program stored on the memory 1102 and capable of running on the processor 1101.

In this embodiment of the present disclosure, the transceiver 1104 is configured to:

send a first message to an access-network-side device, where the first message includes a multicast service identifier and mode policy information, and the mode policy information is used for determining or indicating a transmission mode of a multicast service corresponding to the multicast service identifier.

It should be understood that, in this embodiment of the present disclosure, the processor 1101 and the transceiver 1104 are capable of implementing the processes that are implemented by the core-network-side device in the foregoing method embodiments. To avoid repetition, details are not repeated herein.

An embodiment of the present disclosure further provides a computer-readable storage medium, where the computer-readable storage medium stores a computer program. When the computer program is executed by a processor, the processes of the foregoing embodiment of the service transmission method are implemented, or the processes of the foregoing embodiment of the service transmission mode configuration method are implemented, with same technical effects achieved. To avoid repetition, details are not described again herein. The computer-readable storage medium is, for example, a read-only memory (Read-Only Memory, ROM), a random access memory (Random Access Memory, RAM), a magnetic disk, or an optical disc.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . ." does not preclude existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of the present disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing implementations. The foregoing embodiments are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A service transmission method performed by an access-network-side device, comprising:

receiving a first message from a core-network-side device, wherein the first message comprises a multicast service identifier and mode policy information; and sending, in a first transmission mode, data of a multicast service corresponding to the multicast service identifier, wherein the first transmission mode is a transmission mode determined based on the mode policy information, or the first transmission mode is a transmission mode indicated by the mode policy information;

wherein the mode policy information comprises quality of service requirement information;

the multicast service identifier is any information capable of identifying a multicast service;

wherein the mode policy information determined by the core-network-side device based on at least one of the following:

quality of service requirement of the multicast service corresponding to the multicast service identifier;

a statistical result of joined UEs of the multicast service.

2. The method according to claim 1, wherein the first message further comprises a decision indication; and in a case that the decision indication is a first indication, the first transmission mode is a transmission mode determined based on the mode policy information; and/or in a case that the decision indication is a second indication, the first transmission mode is a transmission mode indicated by the mode policy information.

3. The method according to claim 1, wherein before the receiving a first message from a core-network-side device, the method further comprises:

receiving a second message from the core-network-side device, wherein the second message is used to instruct the access-network-side device to report a statistical result of joined UEs of the multicast service; and sending the statistical result of joined UEs of the multicast service to the core-network-side device.

4. The method according to claim 1, wherein the first transmission mode is a transmission mode determined based on the mode policy information and a first mode parameter; and the first mode parameter comprises at least one of the following: the statistical result of joined UEs of the multicast service or radio resource information of the access-network-side device.

5. The method according to claim 4, wherein in a case that the first mode parameter comprises the statistical result of joined UEs of the multicast service, the method further comprises:

sending a statistical indication of the multicast service through an air interface; and collecting statistics about the number of joined UEs of the multicast service based on response information corresponding to the statistical indication, to obtain a statistical result of joined UEs of the multicast service.

6. The method according to claim 1, further comprising:

sending a third message to the core-network-side device, wherein the third message carries the multicast service identifier and information about the first transmission mode.

7. The method according to claim 1, wherein a transmission mode of the multicast service comprises a point-to-point (PTP) mode and a point-to-multipoint (PTM) mode.

8. A service transmission mode configuration method performed by a core-network-side device, comprising:

sending a first message to an access-network-side device, wherein the first message comprises a multicast service identifier and mode policy information, and the mode policy information is used for determining or indicating a transmission mode of a multicast service corresponding to the multicast service identifier;

wherein the mode policy information comprises quality of service requirement information;

the multicast service identifier is any information capable of identifying a multicast service;

wherein the mode policy information determined by the core-network-side device based on at least one of the following:

quality of service requirement of the multicast service corresponding to the multicast service identifier;

a statistical result of joined UEs of the multicast service.

9. The method according to claim 8, wherein the first message further comprises a decision indication; and in a case that the decision indication is a first indication, a transmission mode used for sending the multicast service by the access-network-side device is a transmission mode determined based on the mode policy information;

and/or in a case that the decision indication is a second indication, a transmission mode used for sending the multicast service by the access-network-side device is a transmission mode indicated by the mode policy information.

10. The method according to claim 8, wherein the mode policy information is determined according to a second mode parameter; and the second mode parameter comprises at least one of the following: quality of service requirement information of the multicast service or a statistical result of joined UEs of the multicast service.

11. The method according to claim 10, wherein in a case that the second mode parameter comprises the statistical result of joined UEs of the multicast service, before the sending a first message to an access-network-side device, the method further comprises:

sending a second message to the access-network-side device, wherein the second message is used to instruct the access-network-side device to report a statistical result of joined UEs of the multicast service; and receiving the statistical result of joined UEs of the multicast service from the access-network-side device.

12. The method according to claim 8, further comprising:

receiving a third message from the access-network-side device, wherein the third message carries the multicast service identifier and information about a first transmission mode, and the first transmission mode is a transmission mode used for sending the multicast service by the access-network-side device.

13. The method according to claim 8, wherein a transmission mode of the multicast service comprises a point-to-point (PTP) mode and a point-to-multipoint (PTM) mode.

14. An access-network-side device, comprising:

a processor; and a memory storing a computer program that is capable of running on the processor, wherein the computer program, when executed by the processor, causes the access-network-side device to perform the following steps:

receiving a first message from a core-network-side device, wherein the first message comprises a multicast service identifier and mode policy information; and sending, in a first transmission mode, data of a multicast service corresponding to the multicast service identifier, wherein the first transmission mode is a transmission mode determined based on the mode policy information, or the first transmission mode is a transmission mode indicated by the mode policy information;

wherein the mode policy information comprises quality of service requirement information;

the multicast service identifier is any information capable of identifying a multicast service;

wherein the mode policy information determined by the core-network-side device based on at least one of the following:

quality of service requirement of the multicast service corresponding to the multicast service identifier;

a statistical result of joined UEs of the multicast service.

15. The access-network-side device according to claim 14, wherein the first transmission mode is a transmission mode determined based on the mode policy information and a first mode parameter; and the first mode parameter comprises at least one of the following: the statistical result of joined UEs of the multicast service or radio resource information of the access-network-side device.

16. The access-network-side device according to claim 14, wherein a transmission mode of the multicast service comprises a point-to-point (PTP) mode and a point-to-multipoint (PTM) mode.

17. A core-network-side device, comprising:

a processor; and a memory storing a computer program that is capable of running on the processor, wherein the computer program, when executed by the processor, causes the core-network-side device to perform the steps of the service transmission mode configuration method according to claim 8.

* * * * *